United States Patent [19] [11] Patent Number: 4,870,694
Takeo [45] Date of Patent: Sep. 26, 1989

[54] METHOD OF DETERMINING ORIENTATION OF IMAGE

[75] Inventor: Hideya Takeo, Kanagawa, Japan

[73] Assignee: Fuji Photo Film Co., Ltd., Kanagawa, Japan

[21] Appl. No.: 172,523

[22] Filed: Mar. 24, 1988

[30] Foreign Application Priority Data

Mar. 24, 1987 [JP] Japan ................................. 62-69649
Jun. 4, 1987 [JP] Japan ................................ 62-104631

[51] Int. Cl.⁴ ........................ G06K 9/46; G06K 9/36; G06K 9/00
[52] U.S. Cl. ......................................... 382/18; 382/6; 382/48
[58] Field of Search ...................... 382/6, 8, 18, 46, 48

[56] References Cited

U.S. PATENT DOCUMENTS 4,258,264  3/1979  Kotera et al. .
4,276,473  6/1981  Kato et al. .
4,315,318  2/1982  Kato et al. .
4,387,428  6/1983  Ishida et al. .
4,490,851 12/1984  Gerhart ................................. 382/18

FOREIGN PATENT DOCUMENTS 0193853 11/1982  Japan .
0214974 12/1983  Japan . .
0200379 11/1984  Japan .
0091484  5/1985  Japan .
0116076  6/1985  Japan .
0051280  3/1986  Japan .
0193004  8/1986  Japan .
0239376 10/1986  Japan .
0239377 10/1986  Japan .

Primary Examiner—Reinhard J. Eisenzopf
Assistant Examiner—Jose M. Solis
Attorney, Agent, or Firm—Sughrue, Mion, Zinn, Macpeak & Seas

[57] ABSTRACT

In an image handling process in which a human body image is recorded and processed and reproduced, the position or orientation of the image, such as a normal erect position or a lying position in which the image is recorded in a 90° rotated position, is automatically determined. The determination of the orientation is carried out by comparing the distribution of the image signal level in the vertical direction of the image with the distribution thereof in the horizontal direction, and the determination based on the difference in pattern of the distributions. The pattern of the distributions is determined by use of a dispersion or symmetry of the distributions. In another aspect, the characteristic values of the image signal level in a vertically extending strip area and a horizontally extending strip area both passing through the central area of the image are compared. As the characteristic values can be used total values or average values of the image signal level. Based on the difference in the characteristic values between the vertical and horizontal strip areas, the orientation of the image or whether the image is in the normal position or not is determined.

8 Claims, 2 Drawing Sheets

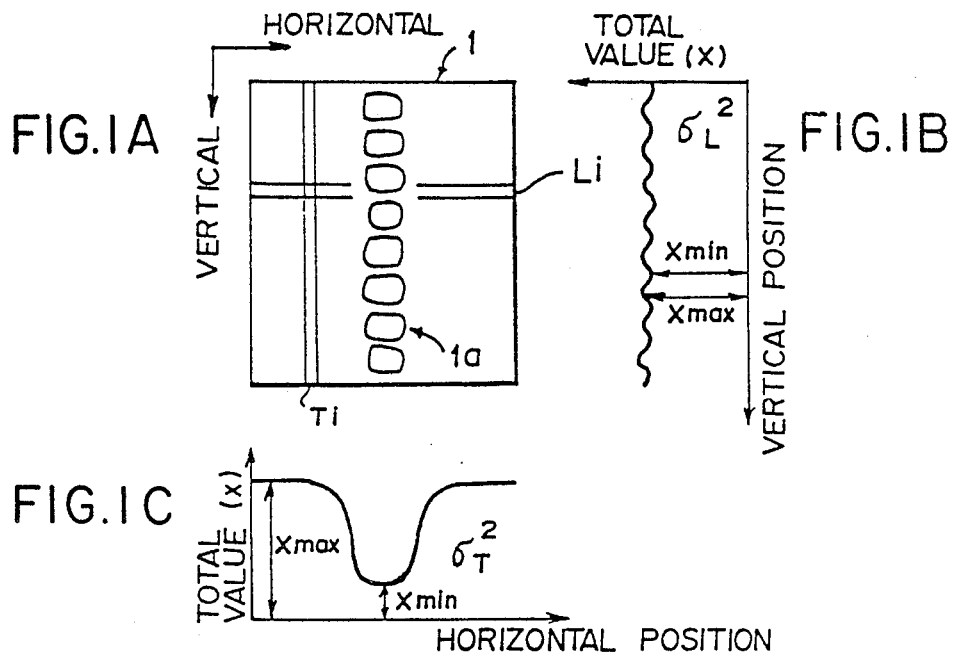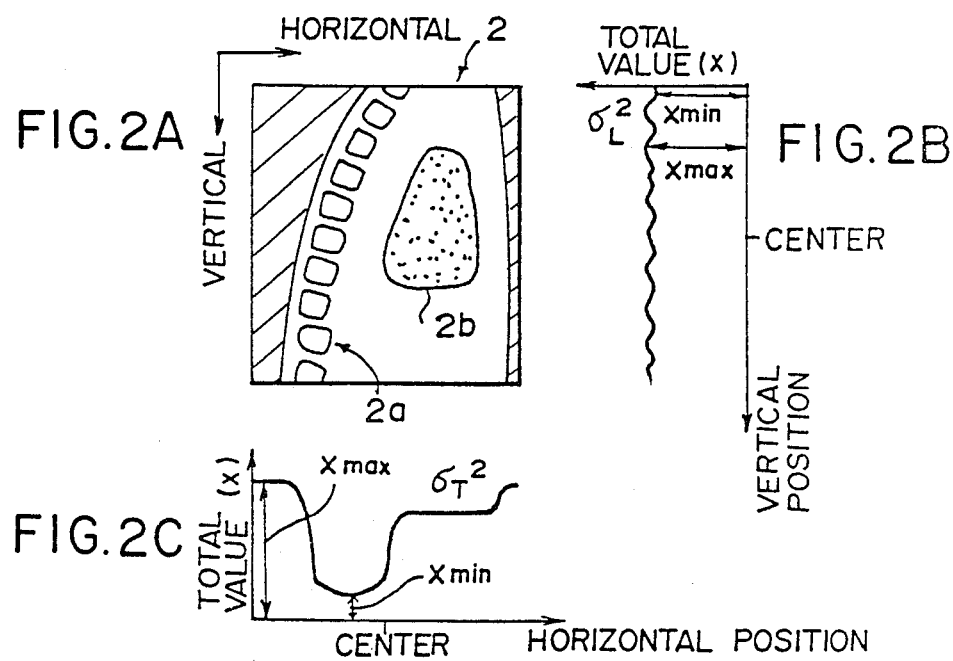

METHOD OF DETERMINING ORIENTATION OF IMAGE

BACKGROUND OF THE INVENTION

1. Field of the Invention

This invention relates to a method of determining the orientation of an image of a human body recorded in the form of digital image signal in a radiation image recording medium, and more particularly to a method of determining whether the recorded image of the human body is in the normal position where the body extends in the longitudinal direction of the rectangular field of the image or it extends in the lateral direction thereof.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the above-described system, when a radiation image information of the chest of a human body is recorded on a stimulable phosphor sheet, for example, the human body is normally recorded in the direction in which the human body extends in the longitudinal direction of the rectangular stimulable phosphor sheet, and the image constituted by the image signal obtained by read-out of the image signal from the sheet is handled as extending in the longitudinal direction of the sheet even when it is reproduced.

However, it sometimes happens that the human body is recorded in the direction lateral to the sheet, that is the human body extends lateral to the longitudinal direction of the rectangular stimulable phosphor sheet. In such a case, the image read out of the sheet presents an image of the human body extending in the lateral direction of the sheet. In other words, the image signal read out in the same order as that of the normal image provides an image in which the vertical direction of the vertically oriented rectangular sheet is perpendicular to the direction in which the human body extends whereas the vertical direction of the sheet is normally parallel to the direction in which the human body extends.

In the above-described system, the image signal is subject to an image processing or image reproduction as on a CRT. Since the image signal is generally processed on the premise that the vertical direction of the image is in the vertical direction of the human body, it is necessary to change the program of the image processing when the direction of the image is not in the normal direction. For example, various algorisms of the image processing are designed for the image vertically oriented and the output process of the image reproduction system for visualizing the image on a CRT is also designed for the vertically oriented image. Therefore, when the image is not vertically oriented and horizontally oriented, it is necessary to change the algorism of image processing and the output process of image reproduction. In order to change the program like this, it is necessary to know whether the image is in the normal or vertical position or orientation or it is in the horizontal orientation.

SUMMARY OF THE INVENTION

In view of the above-mentioned problems, the primary object of the present invention is to provide a method of determining whether the recorded image is in the normal position or in the horizontal position.

The method of determining the orientation of the image in accordance with the first embodiment of the present invention is characterized in that the image signal level distributions are obtained in the vertical direction and in the horizontal direction from the image signal carrying the transmission image of a human body and the orientation of the image is determined on the basis of the difference in the pattern of distributions.

The aforesaid image signal level distribution in the vertical or horizontal direction typically means the distribution of the image signal level in the line of image elements or picture element arranged vertically or horizontally which is called profile or projection, that is the distribution of the total value of the image signal in one picture element line extending in the lateral direction distributed in the vertical direction or the distribution of the total value of the image signal in one picture element line extending the vertical direction distributed in the horizontal direction. However, they are not limited thereto.

The above determination of the orientation based on the difference in the pattern of distribution can be carried out for example by comparing the range of distribution of the two kinds of distributions or comparing the degree of symmetry of the two kinds of distributions. It is possible to determine the orientation by detecting the difference in the pattern of distribution by some other method.

Further, the image signal carrying the transmission image of the human body may not always be the original signal which constitutes the original transmission image, but may be a differentiated image obtained by differentiating the original image or a binary image signal which is obtained by a binary coding system.

The method of determining the orientation of the image in accordance with the second embodiment of the present invention is characterized in that characteristic values of the image signal level in the strip areas extending vertically and horizontally both extending through the central area of the image are obtained and the characteristic values are compared with each other to determine whether the image is in the normal or vertical orientation or in the horizontal orientation.

The human body has various kinds of bones most of which extend vertically through the body normally. Further, the bones are normally hard to transmit radiations as compared with the other parts of the human body. Therefore, in the transmission image of a human body, there are low image signal portions corresponding to bones extending vertically or horizontally.

Accordingly, it is possible to know the orientation of the image of the human body by comparing the distribution of the image signal level such as a profile or projection in the vertical and horizontal directions since the pattern of such distributions shows clear difference according to the direction in which the bones extend.

Further, even in case of the image of the human body different from the chest or the like in which the bones clearly extend in the vertical direction, the distribution of the image signal level is normally different between the vertical image and the horizontal image. In other words, the pattern of the distribution of the image signal level is normally identical to the part of the human body and to the orientation thereof. Therefore, if such patterns are obtained in advance for every part of the human body, it is possible to know the orientation of the image based on the pattern of the image signal level.

Furthermore, in case of an image of the chest of the human body, the image is normally symmetric with respect to the vertical center line when the image is in the vertical orientation. When the image is in the horizontal orientation, it is symmetrical with respect to the horizontal center line.

Accordingly, in this case, by obtaining the characteristic value of the image signal level in the strip areas including the central area and extending vertically and horizontally, it is possible to know the image is in the vertical orientation or in the horizontal orientation.

BRIEF DESCRIPTION OF THE DRAWINGS

FIG. 1 shows an example of an image and the distribution of the image signal level in which A shows an image of the front chest, B shows an example of the distribution of the image signal level in the vertical direction of the image, and C shows an example of the distribution of the image signal level in the horizontal direction of the image, FIG. 2 shows an example of an image and the distribution of the image signal level in which A shows an image of the side chest, B shows an example of the distribution of the image signal level in the vertical direction of the image of A, and C shows an example of the distribution of the image signal level in the horizontal direction of the image A.

DESCRIPTION OF PREFERRED EMBODIMENTS

Figure 3:
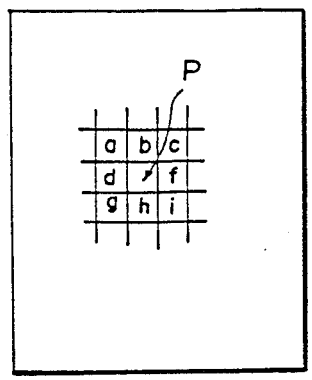
FIG. 3 shows an example of a differential operator.

Now the invention will be described in detail with reference to the accompanying drawings.

The embodiments hereinbelow described are all adapted to a radiation image recording and reproducing system as described hereinbefore.

FIG. 1A shows an image of the front chest of a human body, FIG. 1B shows the lateral projection of the image which is one of the distribution of the image signal level in the vertical direction, and FIG. 1C shows the vertical projection of the image which is one of the distribution of the image signal level in the horizontal direction.

In the aforesaid radiation image recording and reproducing system, the image signal carrying the transmission image of the front chest is read out of the stimulable phosphor sheet and the read out signal is input into an orientation determining circuit wherein the orientation of the image is determined as described hereinbelow.

At first, the lateral projection which presents the image signal level distribution of the input image in the vertical direction and the vertical projection which presents the image signal level distribution of the input image in the horizontal direction are obtained.

Concretely, picture element lines Li extending laterally across the image are made throughout the vertical length of the image, and the total values of the image signal levels of all the picture elements in the respective picture element lines Li are obtained respectively, and the distribution of the total values of the image signal level in the vertical direction, that is the lateral projection as shown in FIG. 1B is obtained. Further, similarly, picture element lines Ti extending vertically through the image are made throughout the horizontal length of the image, and the total values of the image signal levels of all the picture elements in the respective picture element lines Ti are obtained respectively, and the distribution of the total values of the image signal level in the lateral direction, that is the vertical projection as shown in FIG. 1C is obtained.

In the image of the front chest of the human body as shown in the drawing, there is a dorsal vertebra $1a$ extending vertically at the center of the image. The part of the dorsal vertebra 1a hardly transmits the radiation, where the level of the image signal is low. Therefore, the lateral projection ( the vertical distribution of the image signal level ) in this case becomes a linear pattern having substantially the same level throughout the vertical length as shown in FIG. 1B. On the other hand, the vertical projection ( the lateral distribution of the image signal level ) becomes a centrally concave pattern having a lowered central portion at the area where the dorsal vertebra exists as shown in FIG. 1C.

In other words, in case of the image of the front chest, the image signal level distribution in the direction of extension of the dorsal vertebra ( vertical direction in the drawing ) becomes a linear pattern having generally the same level as shown in FIG. 1B, and the image signal level distribution in the direction perpendicular to the direction of extension of the dorsal vertebra ( lateral direction in the drawing ) becomes a centrally concave pattern having a lowered level at the center as shown in FIG. 1C.

Therefore, it is possible to know the orientation of the image by obtaining the image signal level distributions in the vertical and horizontal or lateral direction and determining which distribution is nearly linear and which is of the centrally concave type.

The determination of the distribution pattern can be carried out by various kinds of methods. In the present embodiment, it is conducted by use of dispersion $\sigma^2$ of the two distributions. That is, the dispersion $\sigma_L^2$ of the vertical image signal level distribution and the dispersion $\sigma_T^2$ of the lateral image signal level distribution are compared with each other and the larger dispersion is determined as the centrally concave pattern and the smaller dispersion is determined as the linear pattern.

The dispersion $\sigma^2$ is an average value of $(X-E(X))^2$ where the average value of X is E(X) and X is a variable representing the total value of the image signal level in the respective picture element lines. Therefore, the dispersion of the nearly linear pattern consisting of substantially the same level is much smaller than that of the centrally concave pattern consisting of total values of much different levels. Consequently, it is possible to determine the sort of pattern by use of the dispersion of the pattern.

As mentioned above, the determination of the pattern makes it possible to determine whether the vertical direction of the image is in the normal vertical direction of the recorded human body or in the 90° rotated direction. Then, according to the predetermined content of the normal position of the image (content which indicates what is the normal position, the vertical orientation or lateral orientation) as well as the result of the above determination, it is determined that the image is in the normal erected position or in the lying position.

The determination of the distribution pattern can be conducted by use of factors other than the dispersion. For example, the difference between the maximum and minimum can be used for this purpose. That is, since the difference between the maximum and the minimum (Xmax−Xmin) is much larger in case of the centrally concave pattern than in the linear pattern as apparent from FIGS. 1B and 1C, the determination of the pattern can be made easily by comparing the differences.

FIG. 2A shows the side image of the human chest 2 wherein 2a designates the dorsal vertebra and 2b designates the lung. FIG. 2B shows the lateral projection of the image which is one of the distribution of the image signal level in the vertical direction, and FIG. 2C shows the vertical projection of the image which is one of the distribution of the image signal level in the horizontal direction.

In the side image of the human chest 2, the pattern of the two kinds of projection changes according to the direction. Similarly to the front chest image, the lateral projection representing the vertical distribution of the image signal level becomes generally linear and the vertical projection representing the lateral distribution of the image signal level becomes centrally concave wherein the central portion where the dorsal vertebra exists has a lowered level. Therefore, quite similarly to the case of the front chest, the dispersion ($\sigma_L^2$, $\sigma_T^2$) of the projections or the difference between the maximum and minimum (Xmax−Xmin) can be used for determining the orientation of the image of the human body, whether the image is in the normal erected position or in the lying position.

Further, in case of the front chest the dorsal vertebra is located at the center extending vertically whereas in case of the side chest it is located offset from the center. Therefore, the image of the side chest does not have symmetry as shown in FIG. 2C, wherein the pattern of the image signal level in the lateral direction has no symmetry. Accordingly, in case of the image of the side chest, the orientation of the image can be determined by use of the symmetry of the pattern of the projections. The projection having less symmetry is of the lateral direction of the human body.

As the degree of symmetry, various factors can be employed. For example, the accumulated sum of the differences of the data (total value X for example) at the same distance from the center of distribution (center of the distributions, the vertical center in case of the vertical image signal level distribution, or the center of gravity) can be employed. The smaller the accumulated sum, the higher the degree of symmetry.

In the above embodiment, the vertical and lateral projections are employed as the vertical and lateral image signal level distribution. However, they are not limited thereto. For example, the vertical profile can be used as the vertical image signal level distribution, and the lateral profile can be used as the lateral image signal level distribution. The vertical profile means a distribution of the image signal level in a proper one picture element line extending vertically in the image, and the lateral profile means a distribution of the image signal level in a proper one picture element line extending laterally in the image. Further, a plurality of this kind of profiles may be selected out and added together to determine the orientation. Further, various variations of the projections can be used. For example, instead of the total value of the image signal level in the respective picture element line, an average value or a multiple of the total value and/or the average value can be used.

Furthermore, instead of the image signal of the original input image, somewhat processed image signal which represents the characteristics of the original image can be used. For example, a binary coded image or a differential image in which the image signals are binary coded or differentiated to enhance the image of the dorsal vertebra can be used.

The differential processing can be conducted by various methods. For example, when the image signal levels of the picture elements around one picture element P are a to i as shown in FIG. 3, the differential processing can be conducted by use of a differential operator as represented by $$d_p = |a+2d+g-c\ c\ 2f-i| + |a+2b+c-g-2h-i|.$$

As the threshold value the median value of the profile of the picture element line can be used for the respective picture element lines.

Further, it is also possible to conduct a preprocessing on the original image signal such as a subsampling to extract the image signal at a ratio of 2:1 to shorten the data processing time before obtaining the image signal level distribution from the original image or before obtaining the differential image from the original image.

Now, another embodiment of the present invention will be described with reference to FIGS. 4 and 5.

Figure 4:
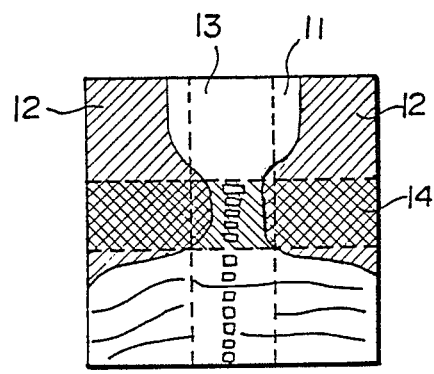
FIG. 4 is an explanatory view which explains the second embodiment of the present invention adapted to the radiation transmission image of the neck portion.

FIG. 4 is an explanatory view for explaining the second embodiment of the present invention in which the total value is employed as a characteristic value for determining the orientation of a radiation image of a neck of a human body. In the image, the image 11 of the human body is a portion where the radiation is absorbed as compared with the surrounding areas 12. Therefore, the image signal level corresponding to the image of the human body 11 is lower than the image signal level corresponding to the surrounding area 12 assuming that the image signal level carrying the image information is in proportion to the dose of the radiation irradiated onto the stimulable phosphor sheet. There are two strip areas 13 and 14, one extending vertically and the other laterally. On strip area 13 extending vertically contains more part of the human body 11 than the other strip area 14 extending laterally. The laterally extending strip area 14 contains a large part of the surrounding area 12. Therefore, when the two areas 13 and 14 have substantially the same area or number of picture elements, the total value of the image signal levels becomes larger in the lateral strip area 14 than in the vertical strip area 13. Therefore, by comparing the total values, it can be determined that when the strip area having the larger value extends laterally the image is in the normal position, and when the strip area having the larger value extends vertically the image is in the horizontal position or lying position.

In case of using the total value as the characteristic value, it is desirable to make the strip areas have substantially the same area. However, when the difference in the total value between the two strip areas is clear in spite of the different area of the strips, the area of the strips may be different. It happens sometimes according to the kind of the part of the image recorded.

Figure 5:
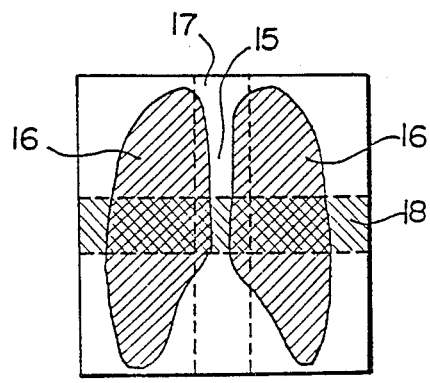
FIG. 5 is an explanatory view which explains the second embodiment of the present invention adapted to the radiation transmission image of the chest.

FIG. 5 is an explanatory view for explaining the second embodiment of the present invention adapted to a radiation image of a front chest of a human body. In this embodiment, as the characteristic value for the image signal level of the vertically and horizontally extending strip areas an average value is used. In the mediastinal septum 15 extending vertically at the center of the image there is a large part of bones having low radiation transmissivity. On the other hand, the lungs 16 have high transmissivity as compared with the mediastinal septum 15 on the average. Therefore, if the image signal is made to have a signal level proportional to the amount of the radiation passing through the human body, the image signal level of the mediastinal septum 15 is lower than the image signal level of the lungs 16 on the average. Accordingly, the average value of the image signal level of the lateral strip area 18 having a large part of lungs 16 and a small part of mediastinal septum 15 is larger than the average value of the image signal level of the vertical strip area 17 having a small part of the mediastinal septum 15 and a large part of lungs 16. Therefore, it is possible to determine that the image is in the normal position when the average value of the lateral strip area 18 is larger than the average value of the vertical strip area 17, and that the image is in the lying position when vice versa.

The width of the strip areas 17 and 18 shown in FIG. 5 is drawn narrower than that of the strip areas 13 and 14 shown in FIG. 4. The width of the strip areas may be determined according to the part of the human body recorded or the relationship in size between the image area and the recorded part of the human body and so forth so that the difference in the average value between the two strip areas may constantly be large.

Further, when the average value is used as the characteristic value, the area of the respective strip areas may be different from each other and may be properly determined to provide the most stable large difference in the average value.

The characteristic value which can be adopted in the present invention is not limited to the aforesaid total value or average value, but may be any kind of value if it is able to provide differences according to the vertical or horizontal strip area. In other words, if the value is extractable from the image signal in the vertical and horizontal strip areas and it is able to provide possibility of determining the orientation of the image, i.e. normal erect position or lying position, such value can be used as the characteristic value.

Further, it should be understood that the present invention is not limited to the images of the above-described parts of the human body but may be adopted to other parts if the orientation of the image can be determined based on the characteristic value of the image signal level in the two strip areas. Furthermore, the present invention is not limited to the radiation transmission image, but may be adopted to a radiation reflection image or an image obtained by irradiating the human body with a supersonic wave.

I claim:

1. A method of determining the orientation of an image of a human body to determine whether the image is in the normal erect position or not comprising the steps of obtaining image signals carrying the image information of the human body, obtaining the distributions of the image signal levels in the vertical direction and horizontal direction of the image, and comparing the pattern of the distribution in the vertical direction with that of the horizontal direction, whereby it is determined whether the image is in the normal position based on the comparison.

2. A method of determining the orientation of an image of a human body as defined in claim 1 wherein said distribution of the image signal levels in each of the vertical and horizontal directions is the distribution of the image signal level in one picture line extending in each of the vertical and horizontal directions.

3. A method of determining the orientation of an image of a human body as defined in claim 1 wherein said distribution of the image signal levels in the vertical direction of the image is the distribution of the sum of the values of the image signal levels in the laterally extending picture element lines in the vertical direction, and said distribution of the image signals levels in the horizontal direction of the image is the distribution of the sum of the values of the image signal levels in the vertically extending picture element lines in the horizontal direction.

4. A method of determining the orientation of an image of a human body as defined in claim 1 wherein said determination based on the comparison of the pattern of the distributions of the image signal levels in the vertical direction with that of the horizontal direction is a determination based on the comparison of the dispersions of the respective distributions of the image signal level in said vertical and horizontal directions.

5. A method of determining the orientation of an image of a human body as defined in claim 1 wherein said determination based on the comparison of the pattern of the distribution of the image signal levels in the vertical direction with that of the horizontal direction is a determination based on the comparison of a symmetry of the respective distributions of the image signal levels.

6. A method of determining the orientation of an image of a human body to determine whether the image is in the normal erect position or not comprising the steps of obtaining image signals carrying the image information of the human body, obtaining characteristic values of the image signal level in strip areas extending vertically and horizontally both extending through the central portion of the image, and comparing the characteristic values of the two strip areas, whereby it is determined whether the image is in the normal position based on the comparison.

7. A method of determining the orientation of an image of a human body as defined in claim 6 wherein said characteristic values are sums of the values of the image signal levels in respective strip areas, and said determination is made based on comparison of said sums.

8. A method of determining the orientation of an image of a human body as defined in claim 6 wherein said characteristic values are average values, and said determination is made based on comparison of the amount of the average values.

* * * * *